Figure 3:
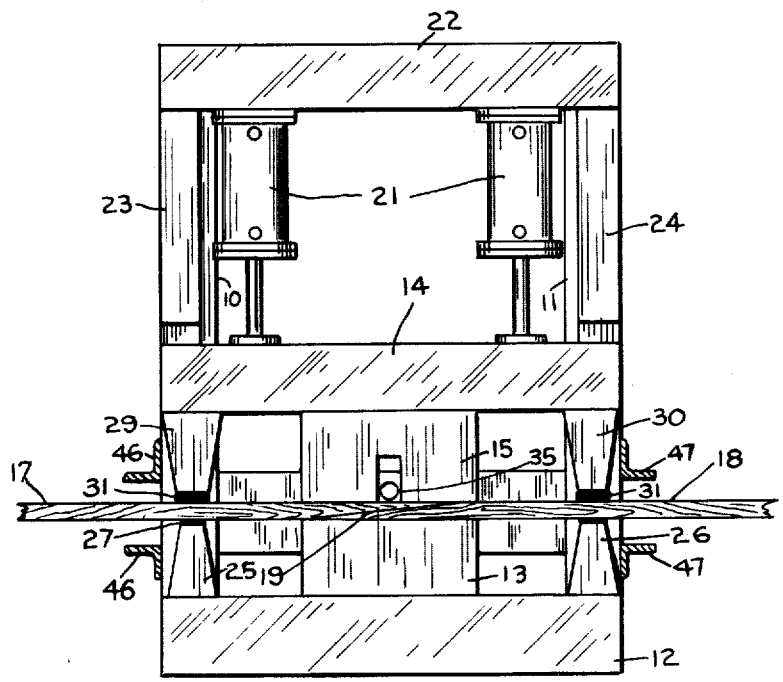

Dec. 5, 1950     H. H. PAYZANT     2,532,419
SCARF JOINT GLUING PRESS
Filed July 8, 1946     2 Sheets-Sheet 1
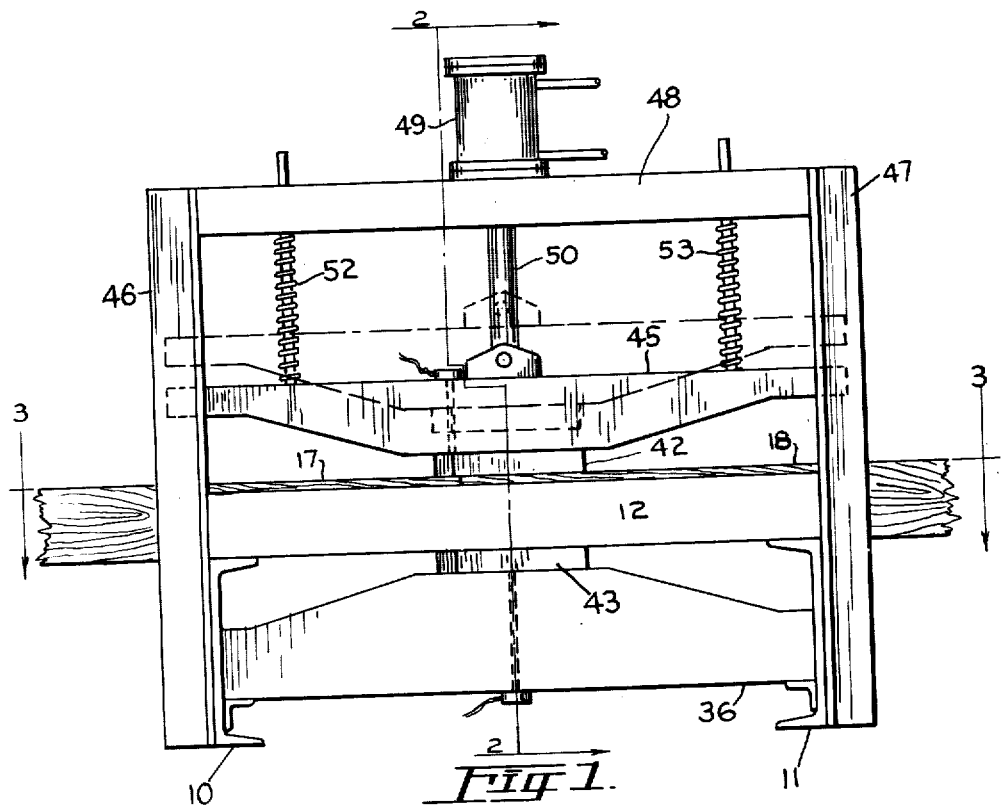
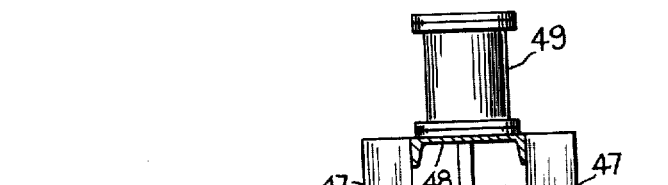
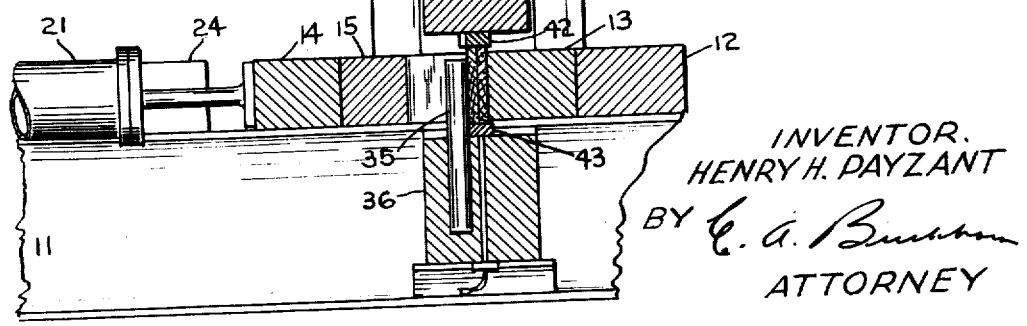
INVENTOR.
HENRY H. PAYZANT
BY
ATTORNEY Dec. 5, 1950        H. H. PAYZANT        2,532,419
SCARF JOINT GLUING PRESS Filed July 8, 1946                                    2 Sheets-Sheet 2

INVENTOR.
HENRY H. PAYZANT
BY
ATTORNEY.

Patented Dec. 5, 1950

2,532,419

UNITED STATES PATENT OFFICE 2,532,419

SCARF JOINT GLUING PRESS

Henry H. Payzant, Seattle, Wash., assignor, by mesne assignments, to Timber Structures, Inc., Portland, Oreg., a corporation of Delaware Application July 8, 1946, Serial No. 681,943

10 Claims. (Cl. 144—281)

The present invention relates to gluing presses and more particularly to presses for use in gluing together the scarfed ends of a pair of boards.

Frequently it is desirable to join relatively short length boards together in end to end relation by cemented scarf joints to form long lengths. The strength of the joint depends largely upon the proper application of pressure across the scarfed end portions previously coated with a film of adhesive therebetween so that the adjacent overlapping surfaces will be firmly bonded together over their entire respective areas. In the event that a plurality of lengths each comprising one or more scarfed joints are to be glued together into a laminated assembly so as to form, for example, a building member such as a beam, it is important that the thickness across the completed joint corresponds accurately with the thickness of the board portions on either side of the joint. If the scarf joint is somewhat thicker than the remainder of the board, the adjacent laminations in the building member will be held out of contact with each other by reason of the thick joint resulting in a weakened cross section of the building member. An excessive thickness of the scarf joint results from the board end portions being excessively overlapped prior to the setting of the adhesive film between the scarf surfaces. On the other hand, if the scarf surfaces are insufficiently overlapped then the thickness across the completed joint will be less than the thickness of the remainder of the board so that in such case also the surfaces of adjacent laminations in the building member will not be glued in contact with each other and again resulting in a weakened cross section of the laminated building member at such point. Prior to the present invention no satisfactory means were known whereby scarf joints of uniform thickness could be produced under shop or quantity manufacturing conditions.

It is an object of the present invention, therefore, to provide a new and improved apparatus for use in gluing together the scarfed surfaces of a pair of adjacent board ends.

A further object of the invention is to provide a new and improved apparatus for use in gluing together the scarfed surfaces of a pair of adjacent board ends whereby the thickness of the completed joint will be of substantially the same thickness as the board on either side of the joint.

A further object of the present invention is to provide a new and improved apparatus for use in gluing together the scarfed surfaces of a pair of adjacent board ends whereby the thickness of joints formed will be substantially uniform in all cases.

A more specific object of the present invention is to provide a new and improved apparatus of the class described including means for gauging the amount of overlap of the scarfed board end portions prior to the application of pressure across the joint.

And another object of the invention is to provide a new and improved apparatus for use in gluing together scarfed board ends with a thermo-setting adhesive and including a novel high frequency current electrode arrangement for effecting heating and rapid setting of the adhesive.

Additional objects and advantages of the invention will appear from the following description taken in connection with the accompanying drawing while the features of novelty will be pointed out with greater particularity in the appended claims.

Figure 4:
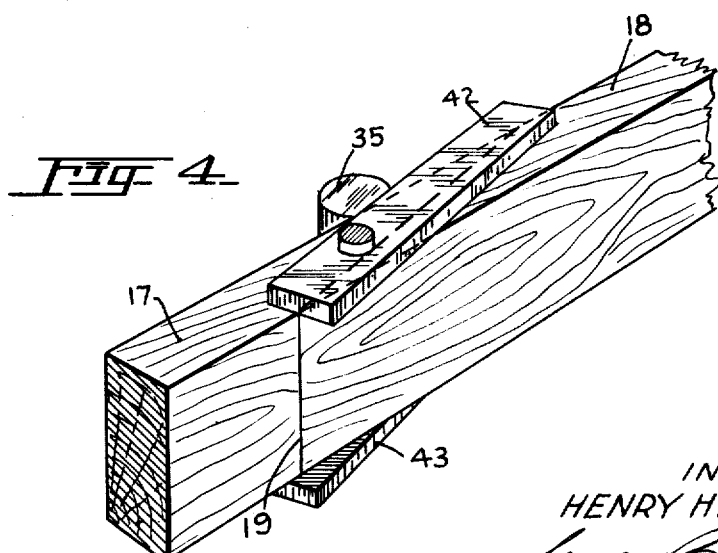

In the drawing Fig. 1 is a front elevation of the glue press constructed in accordance with one modification of the present invention; Fig. 2 is a cross sectional view taken along the line 2—2 of Fig. 1; Fig. 3 is a horizontal sectional view taken along the line 3—3 of Fig. 1; and Fig. 4 is a fragmentary view in perspective illustrating certain details of the apparatus.

The machine of the invention comprises a pair of horizontal base frame members 10 and 11 which may be suitably supported upon legs (not shown). Rigidly secured to the upper surface of the frame members 10 and 11 is a transversely extending clamp jaw backing member 12. A rectangular block or fixed clamping jaw 13 is secured to the rear side of the member 12 the outer face of which defines a clamping surface against which the scarf joint is compressed. A crossbar 14 is slidably supported upon the upper surface of the base frame members 10 and 11, the crossbar 14 being provided on the side thereof facing the clamping block 13, with a rectangular block or movable clamping jaw 15 which is adapted to cooperate with the jaw 13 in compressing therebetween the overlapped scarfed ends of a pair of board sections indicated at 17 and 18, the scarf joint between the board ends being indicated at 19. The bar 14 is adapted to be reciprocated toward and away from the clamp jaw 13 by means of a pair of pressure cylinder devices 21 having their pistons connected to the crossbar 14, the cylinders being mounted at their rear ends upon a suitable backing member 22 rigidly secured to the upper surfaces of the base frame members 10 and 11. Rearward motion of the crossbar 14 is limited by members 23 and 24 secured to the upper surfaces of the base frame members the forward ends thereof defining stops for the rear surfaces of the crossbar 14.

Also secured to the backing member 12 adjacent opposite ends thereof on either side of the central clamping jaw 13 are a further pair of clamp members 25 and 26 the forward surfaces thereof extending in a common plane with the forward surface of the clamp member 13 and preferably slightly therebeyond. The faces of the clamp members 25 and 26 are covered with a friction material indicated at 27 to prevent slippage of the boards with respect thereto during clamping operation. Secured to the crossbar 14 adjacent opposite ends thereof and extending toward the clamping members 25 and 26 are a further pair of clamping members 29 and 30. These clamping members 29 and 30 are faced with blocks 31 of compressible material such as rubber, the outermost surfaces of the rubber blocks normally extending somewhat beyond the plane of the face of the clamp jaw 15.

A gauge element in the form of a round rod 35 is fixedly mounted forwardly of the face of the clamp jaw 13 and spaced therefrom by a distance only slightly greater than the thickness of the boards 17 and 18. The lower end of the gauge rod 35 is securely fastened in a transverse block 36 extending between the base frame members 10 and 11. It will be observed that the gauge element 35 is centrally positioned relative to the opposite ends of the jaw 13 and extends parallel with the face thereof and at right angles to the length of the boards 17, 18. The length of the clamping members 13 and 15 is somewhat greater than the length of the scarfed surfaces 19 of the board ends.

In the use of the machine as thus far described, the crossbar 14 and the clamping members 15, 29 and 30 will be first withdrawn from the cooperating clamping members 13, 25 and 26 to a rearward position. One board, such as 17 is then adjusted so that the scarfed end surface thereof it centrally positioned with respect to the clamping member 13. The other board 18, having its scarfed end surface coated with an adhesive film is then moved manually into an overlapping relation with respect to the end of the board 17. The board 17 is held stationary with one hand while the board 18 is moved into overlapping relation therewith so that the overlapped tapered board ends will fit snugly between the face of the clamp jaw 13 and the gauge element 35. The degree of overlap of the scarfed board ends will thus be definitely determined. In view of the fact that the gauge pin 35 is spaced from the face of the clamping member 13 by a distance very slightly greater than the thickness of the boards 17, 18 compensation is thus provided for the thickness of the glue film between the scarf surfaces. Pressure fluid is then admitted to the cyinders 20 and 21 whereupon the crossbar 14 will be pushed forwardly. The compressible face portions 31 on the forward ends of the clamping members 29 and 30 will first clamp the boards 17 and 18 against the opposed clamping members 25 and 26 on each of the opposite sides of the joint and thus positively hold the boards against endwise movement as the clamping jaw 15 is brought into operative position. The compressible rubber blocks 31 on the ends of the clamping members 29, 30 permit the continued forward movement of the crossbar 14 while sufficient pressure is exerted against the boards 17 and 18 on opposite sides of the joint to resist any slippage between the scarfed surfaces upon application of pressure thereto. Upon compression of the overlapped board end portions between the clamp jaws 13 and 15 the glue film will be forced into the wood cells of the adjacent surfaces and which are thereby brought into intimate contact with each other. The thickness of the resultant joint will thereupon be reduced to substantially the same thickness as the boards adjacent the joint. The clamping pressure is maintained across the joint until the glue between the scarf surfaces has set whereupon the cylinders 21 may be discharged for withdrawing the movable clamping members to permit shifting of the joined board endwise of the machine and for formation of the next successive joint.

In order that the glue film may be caused to set within a relatively short space of time a thermo-setting type of glue may be used and heat may be applied thereto by any suitable means. The clamping press of the present invention is preferably provided with a pair of electrode elements 42 and 43 which may be connected to a suitable high frequency generator (not shown) for applying a high frequency current across the glue line for effecting heating and rapid setting thereof. As illustrated in the drawings the electrodes consist of elongated bars of metal, such as copper, which are suitably mounted at an angle corresponding to the angle of taper of the scarf surfaces of the board ends so that the electrodes will be symmetrically disposed with respect to the glue line on opposite edges of the joint. The lower electrode 43 is suitably secured to the upper surface of the transversely extending member 36, the upper surface of the electrode 43 extending substantially in the plane of the upper surface of the base frame members 10 and 11. The upper electrode 42 is mounted on the lower surface of a crossbar 45, the opposite ends of which are suitably guided between upwardly extending angle iron members 46 and 47. A transverse frame member 48 is mounted across the upper ends of the angle iron upright members 46 and 47 and a fluid operated servo-motor 49 is centrally mounted thereupon having a piston rod 50 suitably connected to the upper surface of the member 45. The crossbar 45 is normally biased downwardly by a pair of compression springs 52 and 53 arranged around guide rods suitably secured at their lower ends into the cross member 45 and freely slidable at their upper ends in cooperating openings provided in the upper frame member 48. The cross member 45 is held in an upper position by the servo-motor 49 and upon release of the pressure fluid therefrom the cross member 45 is permitted to drop downwardly by reason of the compression springs 52 and 53 to bring the lower surface of the electrode 42 into contact with the joint of the board ends between the clamping members 15 and 13 and more particularly into contact with the outer edges of the glue film.

Having described the invention in what is considered to be a preferred embodiment thereof it is desired that it be understood that the specific details shown are merely illustrative and that the invention may be carried out by other means.

What I claim is:

1. In a scarf joint gluing press the combination comprising a fixed clamping member having a length somewhat greater than the length of the scarf on the board ends, a pin fixedly mounted in a spaced relation forwardly of said fixed clamping member a distance slightly greater than the thickness of the boards, and a movable clamping member for cooperatively clamping the overlapped scarfed board ends against said fixed clamping member and a slot in said second clamping member for cooperatively receiving said pin.

2. In an apparatus for clamping together the overlapped scarfed ends of a pair of boards with a layer of unset glue therebetween, said apparatus comprising a fixed clamping member having a length somewhat greater than the length of the scarfs on the board ends, a fixed gauge pin spaced forwardly of the center of said first clamping member a distance only slightly greater than the thickness of one of said boards, and a movable clamping member for cooperatively clamping the overlapped scarfed board ends against said first clamping member, said movable member having a centrally disposed slot therein for cooperatively receiving said pin.

3. In an apparatus for gluing together scarfed ends of boards, the combination comprising a first stationarily mounted clamping member having a length somewhat greater than the length of the scarf of said board ends, a gauging element fixedly mounted in a spaced relation from said fixed clamping member, the space between said fixed clamping member and said gauging element being slightly greater than the thickness of said boards, a movable clamping member for cooperatively clamping the overlapped scarfed board ends against said first clamping member, said movable clamping member being bifurcated for straddling said gauging element as said movable clamping member is moved toward said fixed clamping member.

4. In a scarf joint gluing press, the combination comprising a pair of relatively movable jaws adapted to receive therebetween a pair of overlapped scarfed board ends, a gauge element fixedly secured relative to one of said jaws and extending parallel therewith and at right angles to the length of the board extending between said jaws, said gauge element being spaced a predetermined distance from the face surface of said one jaw for gauging therebetween the thickness of the overlapped board ends prior to the clamping thereof between said jaws.

5. In a scarf joint gluing press, the combination comprising a pair of relatively movable jaws adapted to receive therebetween a pair of overlapped scarfed board ends, a relatively narrow gauge element fixedly secured with respect to one of said jaws, said element extending parallel with the face of said one jaw and spaced therefrom a predetermined distance for gauging the thickness of the overlapped board ends prior to the clamping thereof between said jaws, the second of said jaws being slotted in alignment with said element for straddling said element upon movement of said second jaw toward said first jaw.

6. In a scarf joint gluing press, the combination comprising a pair of relatively movable jaws adapted to receive therebetween a pair of overlapped scarfed board ends, a gauge element fixedly secured relative to one of said jaws, said gauge element extending parallel with and in a spaced relation with respect to said one jaw and extending in a direction at right angles to the length of the board to be joined together, said second jaw member being bifurcated in alignment with said element for straddling said gauge element as said jaws are moved together for clamping said overlapped board ends together.

7. In a scarf joint gluing press, the combination comprising a pair of relatively movable jaws adapted to receive therebetween a pair of overlapped scarfed board ends, a gauge element fixedly secured in a predetermined spaced apart position relative to one of said jaws for gauging the thickness of the overlapped board ends between said element and said one jaw prior to the clamping thereof between said jaws, two pairs of relatively movable jaws one of each of said last mentioned pairs being mounted on each of the opposite sides of said first pair of jaws, said last mentioned jaws being spaced apart less than the spacing between said first pair of relatively movable jaws in the open condition of said press whereby said last mentioned jaws will engage with the opposite sides of the two boards to be joined together prior to the engagement of said first pair of jaws with said scarfed end portions.

8. In a scarf joint gluing press, the combination comprising a pair of relatively movable jaws adapted to receive a pair of overlapped scarfed board ends therebetween, a pair of relatively movable clamping jaws mounted on each of the opposite sides of said first pair of relatively movable jaws, at least one of each of said last mentioned pairs of jaws having a resilient compressible face portion, said last mentioned pairs of jaws being spaced apart a distance less than the spacing between said first pair of relatively movable jaws in the open condition of said press whereby said last mentioned pairs of jaws will engage with and secure therebetween the boards on the opposite sides of said scarf end portions and to retain said boards in fixed relation with respect to each other prior to the engagement of said scarf end portions between said first pair of jaws.

9. In a scarf joint gluing press, the combination comprising a pair of relatively movable jaws adapted to receive a pair of overlapped scarfed board ends therebetween in such a manner that the adjacent surfaces of said overlapped board ends are compressed together upon movement of said jaws toward each other, a pair of parallel elongated high frequency current electrodes, relatively adjustable means supporting said electrodes for movement relatively toward each other in a direction at right angles to the direction of movement of said jaws, said electrodes being adapted for movement into engagement with the opposite edges of said overlapped board ends, said electrodes being angularly disposed with respect to the faces of said jaws so as to be substantially centered over the edges of the angular joint between said scarfed surfaces of said board ends, a gauge pin extending parallel with the face of one of said jaws and in a predetermined spaced apart relation with respect thereto, said pin being adapted to receive between it and said one jaw said pair of overlapped scarfed board ends for limiting the amount of overlap of said board ends, said pin being symmetrically disposed with respect to said electrodes and serving as a guide for positioning the overlap joint between said board ends cooperatively between said electrodes.

10. In a scarf joint gluing press, the combination comprising a base frame, a pair of relatively movable jaws mounted on said base frame for movement in the horizontal direction and being adapted to receive a pair of overlapped scarfed board ends therebetween, said overlapped board ends having a film of thermo-setting adhesive applied thereto and being adapted to be positioned between said jaws in such a manner that the scarf surfaces of said board ends are compressed together upon movement of said jaws toward each other, two cooperating pairs of relatively movable clamping members mounted on said base frame, one of said last mentioned pairs being mounted on each of said opposite sides of said pair of jaws, one of each of said two pairs of clamping members having a resilient compressible face portion, the spacing between said pairs of clamping members being less than the spacing between said jaws in the open condition of said press whereby said two clamping members will engage with opposite sides of the two boards prior to engagement of said overlapped board ends by said jaws, and high frequency current electrodes movable into engagement with the opposite edges of said overlapped board end portions between said jaws.

HENRY H. PAYZANT.

REFERENCES CITED

The following references are of record in the file of this patent:

UNITED STATES PATENTS

| Number | Name | Date |
|---|---|---|
| 765,744 | Mahar | July 26, 1904 |
| 1,027,419 | Hines | May 28, 1912 |
| 1,154,730 | Runne | Sept. 28, 1915 |
| 1,396,971 | Meyercord | Nov. 15, 1921 |
| 1,796,764 | Perry | Mar. 17, 1931 |
| 2,129,276 | Herr | Sept. 6, 1938 |
| 2,231,457 | Stephen | Feb. 11, 1941 |
| 2,317,281 | Linquist | Apr. 20, 1943 |
| 2,344,488 | Bowling | Mar. 21, 1944 |

FOREIGN PATENTS

| Number | Country | Date |
|---|---|---|
| 871,825 | France | Jan. 22, 1942 |

OTHER REFERENCES

Pages 566 and 567 of A. S. M. E. pamphlet for Aug. 1944 by Russell and Mann.